United States Patent
Wing

[11] Patent Number: 5,315,763
[45] Date of Patent: May 31, 1994

[54] HEADLIGHT AIMING DEVICE AND METHOD

[75] Inventor: Philip A. Wing, Troy, Mich.

[73] Assignee: Chrysler Corporation, Highland Park, Mich.

[21] Appl. No.: 7,209

[22] Filed: Jan. 22, 1993

[51] Int. Cl.⁵ .............................................. G01B 11/27
[52] U.S. Cl. ......................................... 33/288; 33/335; 33/DIG. 21; 356/121
[58] Field of Search ................ 33/288, 286, 264, 293, 33/DIG. 21, 335; 362/61, 64, 66; 356/121

[56] References Cited

U.S. PATENT DOCUMENTS

| | | | |
|---|---|---|---|
| 2,867,910 | 1/1959 | Falge | 33/335 |
| 3,029,515 | 4/1962 | Marteil | . |
| 3,467,473 | 9/1969 | Preston | 356/121 |
| 3,532,433 | 10/1970 | Hopkins et al. | 356/121 |
| 3,612,949 | 10/1971 | Becraft et al. | . |
| 3,666,369 | 5/1972 | Carrigan | 33/288 |
| 3,788,747 | 1/1974 | Rahme | 356/121 |
| 4,438,567 | 3/1984 | Raiha | 33/286 |
| 4,513,356 | 4/1985 | Mikola | . |
| 4,566,202 | 1/1986 | Hamar | 33/286 |
| 4,634,275 | 1/1987 | Yoshida et al. | 356/121 |
| 5,056,916 | 10/1991 | Kikuchi et al. | 356/121 |
| 5,077,905 | 1/1992 | Murray, Jr. | 33/DIG. 21 |
| 5,078,490 | 1/1992 | Oldweiler et al. | 356/121 |
| 5,210,589 | 5/1993 | Kaya et al. | 356/121 |

Primary Examiner—William A. Cuchlinski, Jr.
Assistant Examiner—C. W. Fulton
Attorney, Agent, or Firm—Edward A. Craig

[57] ABSTRACT

A method of aiming a headlight for a vehicle includes removing a bulb from a headlight, installing an aiming device in the headlight in place of the bulb, and connecting the aiming device to a source of power to produce a laser beam. The method also includes locating the laser beam on an aiming screen placed in front of the vehicle and adjusting the position of the headlight, if necessary, to locate the laser beam at a predetermined position on the aiming screen.

10 Claims, 1 Drawing Sheet

HEADLIGHT AIMING DEVICE AND METHOD

BACKGROUND OF THE INVENTION

1. Field of the Invention

The present invention relates generally to headlights for vehicles and, more particularly to, a device and method for aiming a headlight of a vehicle.

2. Description of the Related Art

Generally, vehicles such as automotive vehicles have headlights to illuminate the road surface during night driving. Typically, the headlight has a replaceable bulb disposed within a reflector portion and lens portion. The reflector portion has a rear opening for accepting the bulb. The lens portion is attached to the reflector portion to diffuse light from the bulb.

Recently, vehicle headlights have been made with a clear, "non-optic", lens portion. The non-optic lens portion does not have ribs, projections, etc. to scatter the light from the bulb. As a result, the headlight must be aimed to direct light from the bulb along a predetermined path relative to the vehicle. Several attempts have been made to aim the headlight as disclosed in U.S. Pat. Nos. 3,532,433 and 3,788,747. However, these patents have an external device which attaches either to the lens portion or directs light into the headlight which is undesired.

SUMMARY OF THE INVENTION

It is, therefore, one object of the present invention to provide a headlight aiming device and method.

It is another object of the present invention to provide a device and method for aiming a headlight having a non-optic lens portion.

It is yet another object of the present invention to provide a headlight aiming device which is internal to the headlight.

It is a further object of the present invention to provide a new, low cost and accurate headlight aiming device and method.

To achieve the foregoing objects, the present invention is a headlight aiming device and method. The method includes the steps of removing a bulb from a headlight, installing an aiming device in the headlight in place of the bulb, and connecting the aiming device to a source of power to produce a laser beam. The method also includes locating the laser beam on an aiming screen placed in front of the vehicle and adjusting the position of the headlight, if necessary, to locate the laser beam at a predetermined position on the aiming screen.

One advantage of the present invention is that a headlight aiming device and method is provided. Another advantage of the present invention is that a laser replaces the bulb in the headlight for aiming. Yet another advantage of the present invention is that the laser allows for proper aiming at a headlight having a non-optic lens portion without the need for special lens or external devices. A further advantage of the present invention is that the laser provides a low cost and accurate aiming device and method.

Other objects, features and advantages of the present invention will be readily appreciated as the same becomes better understood after reading the following description taken in conjunction with the accompanying drawings.

DESCRIPTION OF THE PREFERRED EMBODIMENT(S)

Figure 1:
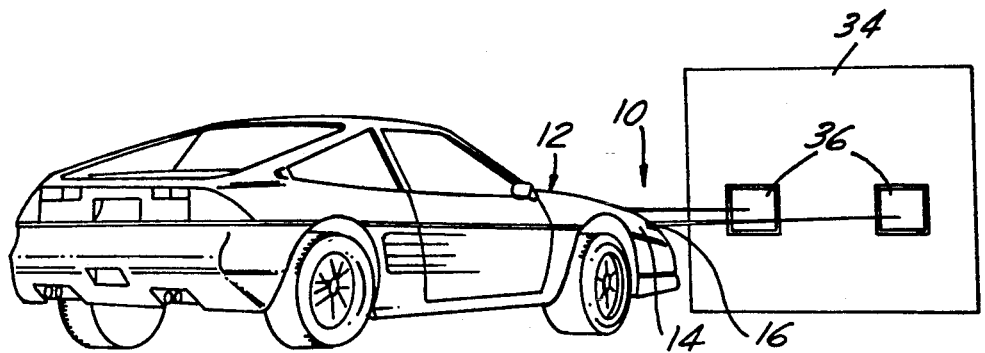
FIG. 1 is a perspective view of a headlight aiming device and method, according to the present invention, illustrated in operational relationship to a vehicle.
Figure 2:
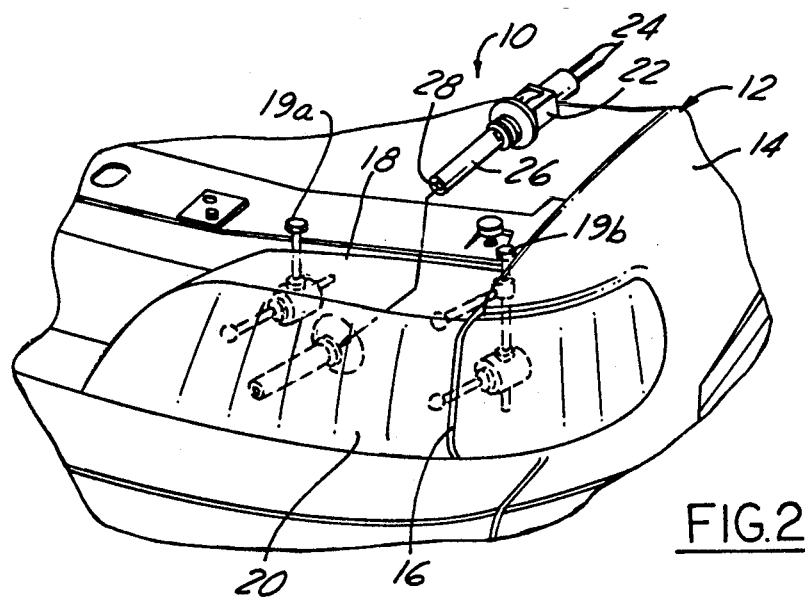
FIG. 2 is a perspective view of the headlight aiming device and a forward portion of the vehicle of FIG. 1.

Referring to the drawings and in particular to FIGS. 1 and 2 thereof, a headlight aiming device 10, according to the present invention, is illustrated in operational relationship with a vehicle, generally indicated at 12, such as an automotive vehicle. The vehicle 12 includes a forward portion 14 having at least one, preferably a pair of headlights 16. The headlight 16 has a reflector portion 18 mounted in a holding fixture or housing (not shown) to the vehicle 12. The reflector portion 18 is moveable or rotatable laterally and vertically by adjustment mechanisms 19a and 19b, respectively. The headlight 16 also has a lens portion 20 attached to the reflector portion 18. The headlight 16 further has a bulb or lamp (not shown) removeably disposed through an aperture (not shown) in the reflector portion 18 and within the headlight 16 as known in the art. The lens portion 20 of the headlight 16 in front of a laser portion 26 of a headlight aiming device 10 is clear or transparent and does not include optical structures for diffusing light from the bulb. It should be appreciated that the lens portion 20 may include decorative graphics or optical structures which are not positioned in front of laser portion 26. It should also be appreciated that the headlight 16 is conventional and known in the art.

Figure 3:
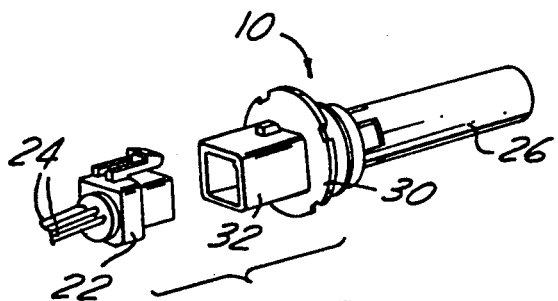
FIG. 3 is an exploded perspective view of the headlight aiming device of FIGS. 1 and 2.

Referring to FIGS. 2 and 3, the bulb is attached to a holder 22 which is, in turn, electrically connected by wires 24 to a power supply such as a vehicle battery (not shown). For the present invention, the bulb is replaced with the headlight aiming device 10. The headlight aiming device 10 has a laser portion 26 with an opening 28 at one end for a beam of light. The headlight aiming device 10 also has a mounting portion 30 which is similar to the bulb and is mounted in the aperture of the reflector portion 18. The headlight aiming device 10 further has a receiver portion 32 to receive the holder 22. It should be appreciated that the mounting portion 30 and receiver portion 32 are conventional and known in the art.

In operation, a method of aiming the headlight 16, according to the present invention, will be described. The method includes placing an aiming screen 34 at a predetermined distance such as twenty-five feet in front of the vehicle 12 as illustrated in FIG. 1. The aiming screen 34 has at least one, preferably a pair of targets 36. The targets 36 are of a predetermined size such as four by four inches. It should be appreciated that the targets 36 are located to coincide with the vehicle longitudinal axis and centerlines of the headlights 16.

Next, the method includes removing the bulb from the reflector portion 18 of the headlight 16. The method includes installing the headlight aiming device 10 in the headlight 16 in place of the bulb. The laser portion 26 is extended through the reflector portion 18 and the mounting portion 30 is engaged with the reflector portion 18. The holder 22 is connected to the receiver portion 32. Since the lens portion 20 has no optics in front to change the path of the laser beam from opening 28, the laser beam from opening 28 will appear on the aiming screen 34.

The method includes adjusting the position of the headlight 16. The screws of the adjustment mechanisms 19a and 19b are turned to rotate the headlight 16 laterally or vertically, respectively. Once the headlight 16 is properly aimed on the aiming screen 34, the holder 22 is disconnected from the receiver portion 32 and the mounting portion 30 is disengaged from the reflector portion 18. The bulb is reinserted into the reflector portion 18 and the headlights 16 are now aimed and calibrated. It should be appreciated that the laser beam is easier to use than the bulb as an indicator of proper headlight aiming.

Figure 4:
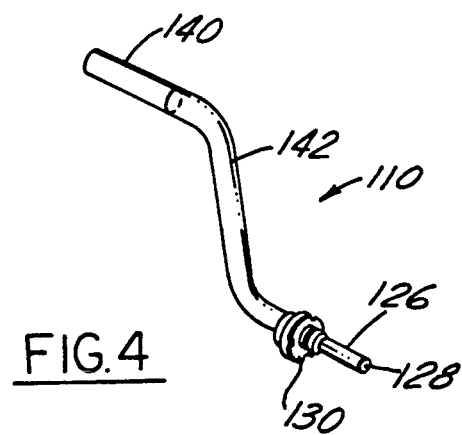
FIG. 4 is an alternate embodiment of the headlight aiming device of FIGS. 1 and 2.

Referring to FIG. 4, an alternate embodiment 110 of the headlight aiming device 10 is shown. Like parts of the headlight aiming device 10 have like numerals increased by one hundred (100). The headlight aiming device 110 is of the fiber optic type and has a laser portion 126 and mounting portion 130 mounted to the headlight 16. The headlight aiming device 10 includes a laser 140 located remotely on the vehicle 12 and a fiber optic bundle 142 interconnecting the laser 140 and the mounting portion 130. The headlight aiming device 110 is used for aiming the headlight 16 similar to the headlight aiming device 10 as previously described.

Accordingly, the headlight aiming device 10 provides a low cost and accurate method of aiming the headlight 16. Once aimed, if the bulb burns out and needs replacement, the headlight 16 does not have to be re-aimed but merely the bulb replaced. Further, the headlight aiming device 1 eliminates the need for special adapters because the mounting portion 30 has the same structure as the bulb and fits into the aperture of the reflector portion 18.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of aiming a headlight for a vehicle, comprising:
    removing a bulb from a headlight;
    installing a laser aiming device in the headlight in place of the bulb;
    connecting the aiming device to a source of power to produce a laser beam;
    locating the laser beam on an aiming screen placed in front of the vehicle; and
    adjusting the position of the headlight, if necessary, to locate the laser beam at a predetermined position on the aiming screen.

2. A method as set forth in claim 1 including the step of placing at least one target on the aiming screen.

3. A method as set forth in claim 2 including the step of aiming the laser beam relative to the target.

4. A method as set forth in claim 1 including the step of disconnecting the aiming device from the source of power and removing the aiming device from the headlight.

5. A method as set forth in claim 4 including the step of reinstalling the bulb in the headlight.

6. A method as set forth in claim 1 wherein said step of adjusting comprises rotating screws on adjuster mechanisms to rotate the headlight laterally or vertically.

7. A method as set forth in claim 1 wherein said step of installing comprises extending a laser portion of the aiming device through an aperture in the headlight and engaging a mounting portion of the aiming device with the headlight to secure the laser portion within the headlight.

8. A method as set forth in claim 7 wherein said step of connecting comprises attaching a connector of the bulb to a receiver portion of the aiming device.

9. A method of aiming a headlight for a vehicle, comprising:
    placing an aiming screen in front of the vehicle having at least one target;
    removing a bulb from a headlight;
    installing a laser aiming device in the headlight in place of the bulb;
    connecting the aiming device to a source of power to produce a laser beam;
    locating the laser beam on the aiming screen;
    adjusting the position of the headlight, if necessary, by rotating screws on adjuster mechanisms to rotate the headlight laterally or vertically to aim the laser beam at a predetermined position relative to the target on the aiming screen
    disconnecting the aiming device from the source of power and removing the aiming device from the headlight; and
    reinstalling the bulb in the headlight.

10. A method of aiming a headlight for a vehicle, comprising:
    removing a bulb from a headlight;
    extending a laser portion of a laser aiming device through an aperture in the headlight and engaging a mounting portion of the aiming device with the headlight to secure the laser portion within the headlight;
    attaching a connector of the bulb to a receiver portion of the aiming device to connect the aiming device to a source of power to produce a laser beam;
    locating the laser beam on an aiming screen placed in front of the vehicle;
    adjusting the position of the headlight, if necessary, by rotating screws on adjuster mechanisms to rotate the headlight laterally or vertically to locate the laser beam at a predetermined position on the aiming screen;
    disconnecting the aiming device from the source of power and removing the aiming device from the headlight; and
    reinstalling the bulb in the headlight.

* * * * *